April 8, 1958
R. E. DAVIS
2,829,900
DOUBLE-ENDED CHUCK
Filed Dec. 21, 1956
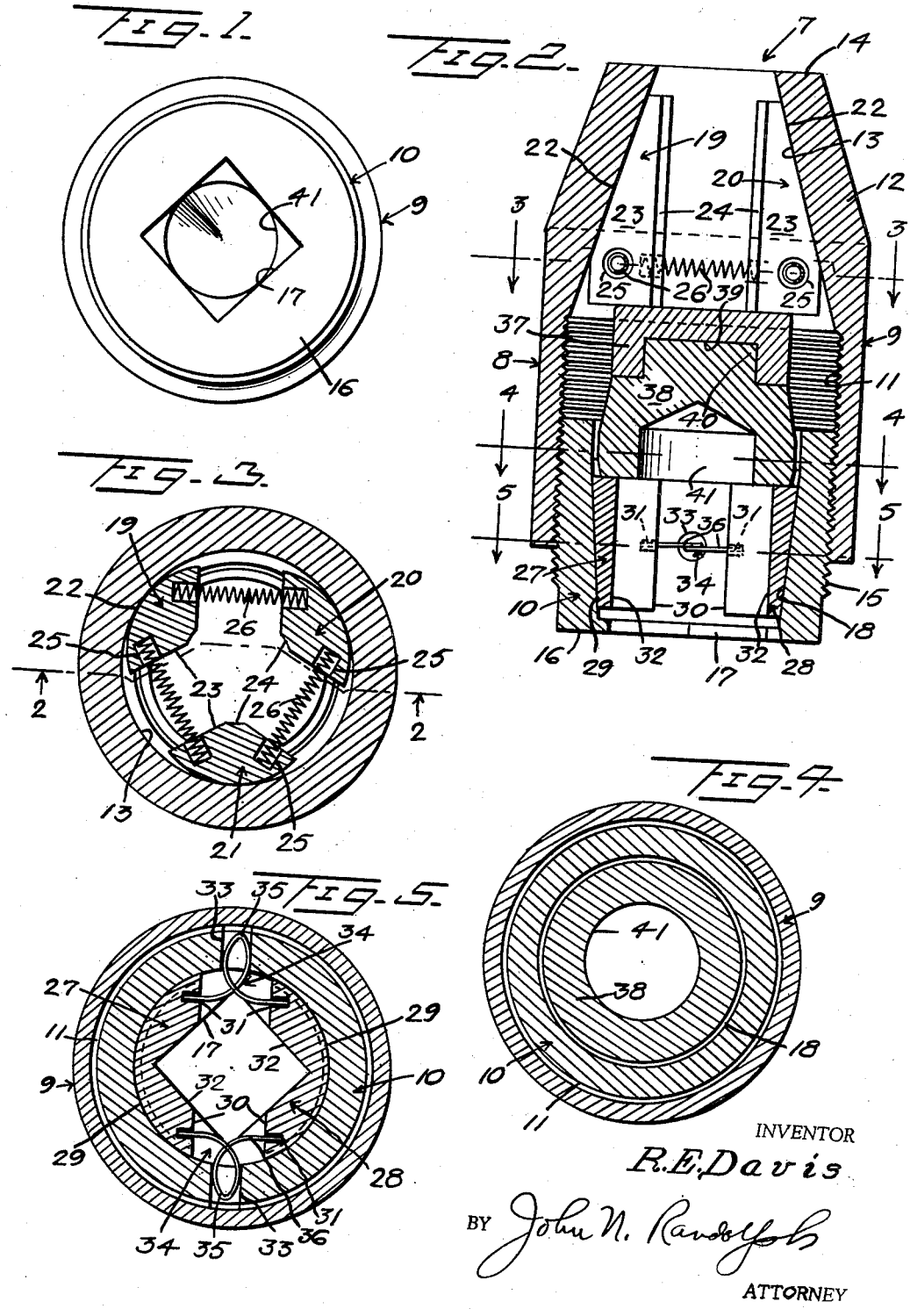
INVENTOR
R. E. Davis
BY John N. Randolph
ATTORNEY

United States Patent Office 2,829,900
Patented Apr. 8, 1958

2,829,900
DOUBLE-ENDED CHUCK

Robert E. Davis, Los Angeles, Calif.

Application December 21, 1956, Serial No. 629,958

6 Claims. (Cl. 279—58)

This invention relates to an improved double-ended chuck having one end in which the shank of a tool bit is received and gripped and an opposite end for receiving and gripping an end of a drive shank of a hand tool or power tool, for coupling the tool shank to the tool bit to cause the bit to turn with the shank.

Another object of the invention is to provide a double-ended chuck which may be quickly secured to a tool bit and drive shank and quickly and easily released therefrom.

Still a further object of the invention is to provide a chuck having novel means to prevent the turning of the chuck jaws while being clamped to and released from driving and driven parts coupled by the chuck.

Various other objects and advantages of the invention will hereinafter become more fully apparent from the following description of the drawing, illustrating a presently preferred embodiment thereof, and wherein:

Figure 1 is an end elevational view looking toward the rear end of a chuck;

Figure 2 is a longitudinal sectional view through the chuck, taken substantially along a plane as indicated by the line 2—2 of Figure 3, and Figures 3, 4 and 5 are cross sectional views through the chuck, taken substantially along planes as indicated by the lines 3—3, 4—4, and 5—5, respectively, of Figure 2.

Referring more specifically to the drawing, the double-ended chuck in its entirety is designated generally 7 and includes a housing, designated generally 8. The housing is composed of a forward sleeve section 9 and a rear sleeve section 10.

The forward housing section 9 has an internally threaded rear end portion 11 of a length preferably as great as the overall length of the rear housing section 10. The front housing section 9 has a forward end portion 12 which is preferably externally tapered and which is provided with a forwardly tapered bore 13 which opens through a substantially flat forward end 14 of the housing section 9, and which bore is of circular cross section. The rear housing section 10 is externally threaded as seen at 15 from its forward end to adjacent its rear end and the threaded portion 15 is sized to threadedly fit the bore portion 11. The rear portion of the housing section 10 extends from the open rear end of the forward housing section 9 and has a substantially flat rear end 16 which is provided with an opening 17 which is square, as seen in Figure 1. The bore 18 of the housing section 10 tapers toward the rear end 16, is of circular cross section and is of a larger diameter at its restricted rear end than the width of the opening 17 measured between two opposite corners thereof. As seen in Figure 2, the opening 17 communicates with the restricted end of the bore 18 and the opposite end of the bore 18 opens through the forward end of the housing section 10 and into the forward housing section 9.

The forward housing section 9 contains a plurality, preferably three, corresponding elongated chuck jaws 19, 20 and 21. Said chuck jaws each include a transversely rounded outer side 22, corresponding side walls 23 which form an obtuse angle with one another, and a substantially straight narrow inner wall 24 which is in the form of a shallow groove and which is disposed substantially concentric to the outer wall 22. The outer wall 22 of each chuck jaw is longitudinally tapered from adjacent its rear end to the forward end thereof to substantially conformably fit the tapered wall of the bore portion 13, as seen in Figures 2 and 3. The side walls 23, adjacent the rear ends of the chuck jaws, are each provided with a socket 25. Each wall 23 is disposed in opposed substantially parallel relation to one wall 23 of another jaw, and compression springs 26 extend between said opposed walls 23 and seat in the sockets 25 thereof. The springs 26 thus urge the chuck jaws radially outward and in combination with the tapered bore 13 and the tapered outer walls 22 which engage said bore, urge the chuck jaws inwardly and rearwardly of the forward housing section 9 and to an open position thereof.

A pair of corresponding jaws 27 and 28 are mounted in the cavity of the rear housing section 10, formed by the tapered bore 18. The jaws 27 and 28 each includes an outer side 29 which is convexly rounded in cross section and which is longitudinally tapered to conformably fit against a portion of the tapered bore 18. Said jaws 27 and 28 are provided with substantially flat inner sides 30 which are disposed in spaced apart substantially parallel relation to one another and which are provided with sockets 31 adjacent the longitudinal side edges of said inner sides. The sides 30 are each provided with a central groove 32, disposed between the sockets 31 thereof which extends from end to end of the jaw. The rear housing section 10 is provided with diametrically aligned inwardly opening recesses or bores 33 which open between the jaw sides 30 and are disposed in the plane of the sockets 31. The jaws 27 and 28 are connected by a pair of springs 34 each comprising a strand of resilient wire which is bent so that an intermediate portion thereof forms a loop 35 which engages one of the recesses or bores 33. The ends or legs 36 cross one another at the inner end of the loop 35 and extend therefrom in opposite directions and have their terminals engaging in aligned sockets 31 of the two jaws. Said spring ends 36 are yieldably urged apart for spring biasing the jaws 27 and 28 away from one another, and the springs 34, by their connection to the housing section 10, prevent the jaws 27 and 28 from turning therein. The springs 34 offer greater resistance to displacement of the jaws engaged thereby toward one another than do the springs 26. The grooved jaw faces 32 align with opposite corners of the square opening 17, as best seen in Figure 2.

A front plug 37 and a rear plug 38 are disposed in the housing 8 between the front chuck jaws 19, 20 and 21 and the rear jaws 27 and 28. The flat forward end of the front plug 37 bears against the rear ends of the chuck jaws 19, 20 and 21. Said front plug 37 has a rearwardly opening socket 39 in which a restricted forward end 40 of the rear plug 38 turnably fits, for swivelly connecting the plugs to one another. The rear plug 38 is preferably provided with a rearwardly opening recess or socket 41 which opens through the rear end thereof, and which rear end engages the inner or forward ends of the rear jaws 27 and 28.

From the foregoing it will be readily apparent that one of the housing sections can be turned relative to the other housing section for partially unscrewing and extending the sections relative to one another to a greater extent than is illustrated in Figure 2, if desired. This will permit the forward chuck jaws 19, 20 and 21 to move further rearward from the forward end 14 of the chuck housing and to assume a more open position with respect to one another so that the gripping faces 24 thereof define portions of a circle as large in diameter as the diameter of the restricted bore 13 which opens through the housing end 14. Likewise, this will permit the rear jaws 27 and 28 to move inwardly or forwardly to a more fully opened position than that disclosed in Figure 2, if desired. The shank end of a tool bit, not shown, of a size ranging from one sixteenth of an inch up to substantially the diameter of the restricted forwarded end of the bore 13, which may be one half inch or greater, can then be inserted through said forward end of the bore 13 and positioned between the three jaw faces 24. The square opening 17 in the rear end of the chuck 7 is adapted to receive a square drive shank, not shown, of a rotary driven power tool and is adapted to have a sufficiently tight fitting engagement therein to prevent the housing section 10 from turning relative to the drive shank. The forward housing section 1 is then held stationary and the square drive shank can be power driven in a clockwise direction to turn the rear housing section 10 clockwise, as seen in Figure 1. This will cause the rear section 10 to be screwed into the forward section 9. When this occurs, the forward plug 37 by engagement with the rear ends of the jaws 19, 20 and 21 will first displace said jaws forwardly for closing said jaws on the bit shank. Thereafter the rear plug 38 will move the rear jaws 27 and 28 rearwardly to cause a closing movement of said rear jaws on the drive shank. This will complete a locking of the chuck to the driving and driven parts. The chuck can be readily released by holding the front housing section 9 immovable while the drive shank is driven in the opposite direction to turn the rear housing section 10 in a counterclockwise direction as seen in Figure 1.

The swivel connection between the plugs 37 and 38 will permit turning of the plugs relative to one another, so that there will be no tendency of the plugs to rotate against the inner ends of the front and rear jaws.

Various other modifications and changes are contemplated and may be resorted to without departing from the function or scope of the invention as hereinafter defined by the appended claims.

I claim as my invention:

1. A double-ended chuck comprising a chuck housing including a forward section and a rear section, said rear section threadedly engaging in and extending from the rear end of the forward section, said housing section each comprising a sleeve, said forward section having a forwardly tapering bore portion opening outwardly of a forward end thereof, a plurality of front chuck jaws loosely disposed in a forward part of the forward housing section and having outer walls slidably engaging said tapered bore, and spring means disposed between and urging said forward chuck jaws apart for cooperating with said tapered bore to urge the chuck paws inwardly of the housing, the rear housing section having a rearwardly tapered bore, rear jaws disposed in said rear housing section and having outer sides engaging the tapered bore thereof, a second spring means engaging and urging said rear jaws apart for cooperating with the tapered bore of the rear housing section for urging the jaws inwardly of the housing, and rigid means loosely disposed in said housing between the front and rear jaws thereof and engaging inner ends of said jaws for displacing the jaws of each set of jaws toward closed positions when the rear housing section is advanced into the forward housing section.

2. A double-ended chuck as in claim 1, said second spring means being stronger than the first mentioned spring means whereby said front chuck jaws will be initially closed and the rear jaws subsequently closed when the rear housing section is advanced into said forward housing section.

3. A double-ended chuck as in claim 1, said rear housing section having a square opening opening outwardly of the rear end thereof and into the restricted end of the tapered bore of the rear housing section, said rear jaws comprising a pair of jaws each having an inwardly opening substantially V-shaped groove, said grooves being disposed substantially in alignment with opposite corners of said square opening, and means connecting said second spring means to the rear housing section to prevent rotation of the rear jaws relative to the rear housing section.

4. A double-ended chuck as in claim 1, said rigid means comprising a forward plug for engaging the front jaws and a rear plug for engaging the rear jaws, and means forming a swivel connection between said plugs whereby rotation of the rear housing section will not cause rotation of the front plug and front jaws.

5. A double-ended chuck comprising a tubular housing formed of threadedly connected front and rear housing sections, said housing having tapered bore portions located adjacent the front and rear ends thereof, a front set of jaws disposed in the front bore portion, a rear set of jaws disposed in the rear bore portion, a front set of springs engaging with an urging the front jaws apart and toward a retracted position within the housing, a rear set of springs urging the rear jaws apart and toward a retracted position within the housing, and rigid means loosely disposed in the housing between the front and rear jaws for engaging adjacent ends of said jaws when the rear housing section is advanced into the front housing section for extending the sets of jaws outwardly of the housing ends to cause the jaws of each set of jaws to be retracted by contact with the tapered bore portion in which said set of jaws is disposed.

6. A double-ended chuck as in claim 5, said rear jaws having grooved jaw faces, said rear housing section having a restricted noncircular opening opening outwardly of the rear end thereof and into the restricted end of the tapered bore of said rear housing section, and means connecting the rear set of springs to the rear housing section for retaining said grooved jaw faces substantially in alignment with corners of said noncircular opening.

References Cited in the file of this patent

UNITED STATES PATENTS

| 1,930,022 | Tautz | Oct. 10, 1933 |
| 2,040,678 | Van Buskirk | May 12, 1936 |

FOREIGN PATENTS

| 14,309 | Great Britain | July 11, 1899 |